Jan. 23, 1934.          F. V. MEINDL          1,944,566
BIRD CAGE
Filed Nov. 16, 1929
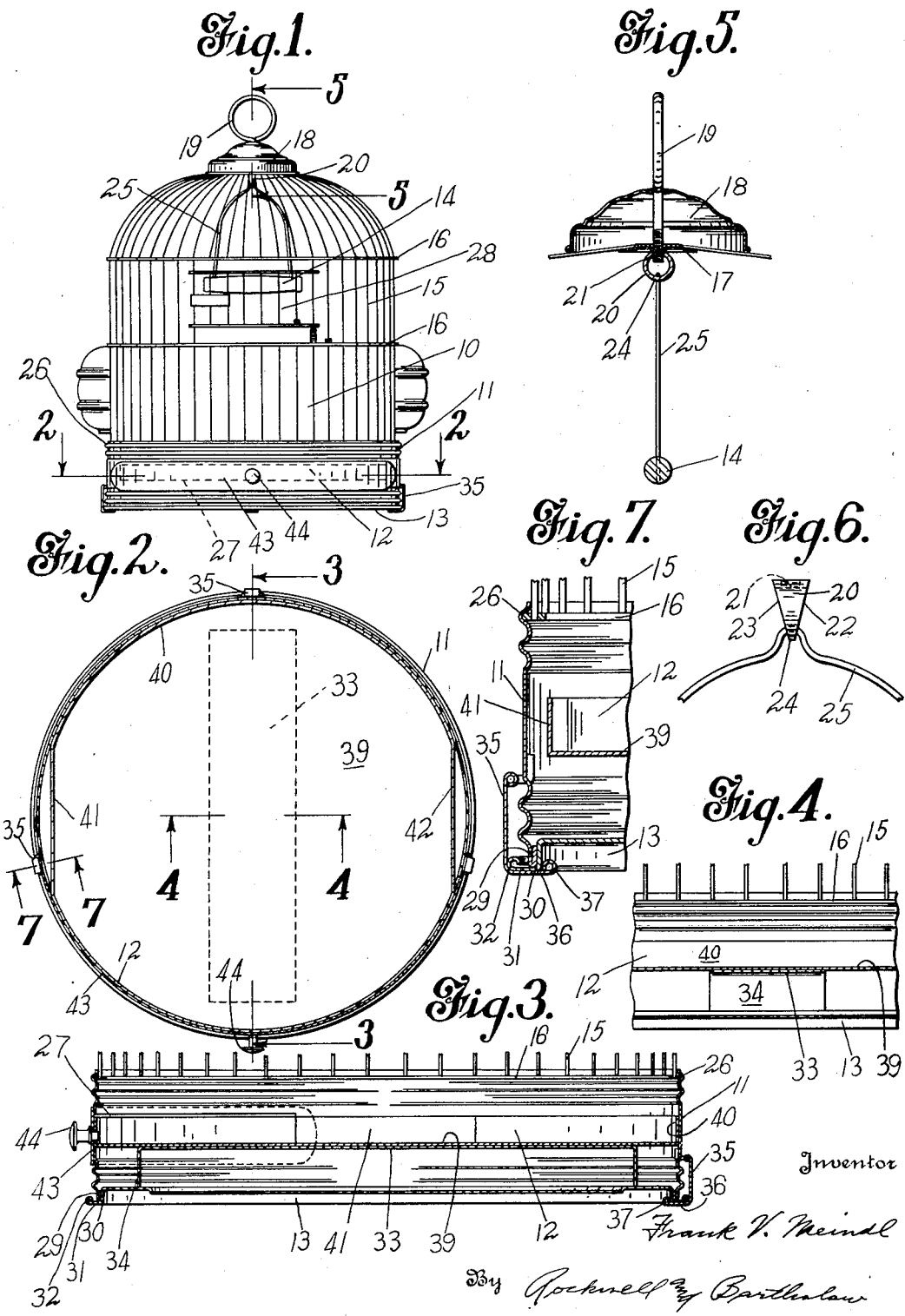
Inventor
Frank V. Meindl
By Rockwell & Bartholow
Attorneys Patented Jan. 23, 1934

1,944,566

UNITED STATES PATENT OFFICE 1,944,566

BIRD CAGE

Frank V. Meindl, Chicago, Ill., assignor to The Andrew B. Hendryx Company, New Haven, Conn.

Application November 16, 1929
Serial No. 407,688

6 Claims. (Cl. 119—17)

This invention relates to cages, and more especially to a bird cage and to improvements in the construction thereof.

One of the objects of this invention is to provide an improved bird cage of the drawer tray type that will be economical to manufacture and efficient in use, and to furnish an improved form of base structure for bird cages.

Another object is to provide an improved bird cage wherein the drawer tray may be readily received and supported.

Another object is to provide an improved removable bottom plate for a bird cage.

To these and other ends, the invention consists in the novel features and combinations of parts to be hereinafter described and claimed.

In the accompanying drawing:

Fig. 1 is a front elevation of a bird cage, embodying the features of this invention;

Fig. 2 is a section on line 2—2 of Fig. 1;

Fig. 3 is a section on line 3—3 of Fig. 2;

Fig. 4 is a partial section on line 4—4 of Fig. 2;

Fig. 5 is a partial section on line 5—5 of Fig. 1;

Fig. 6 is a side view of the swing supporting member shown in Fig. 5, and

Fig. 7 is a partial section on line 7—7 of Fig. 2.

The bird cage selected to illustrate the features of this invention comprises a body 10, having a band 11 disposed about the lower portion thereof, a drawer type tray 12, a cage bottom plate 13 and a bird swing bar 14. The upper portion of the cage body is formed by a plurality of vertically disposed circumferentially spaced apart wire rods 15, secured to vertically spaced apart bars or rails 16, and the lowermost rail 16 is disposed at the lower ends of the rods 15 and extends inwardly from the band 11 to overhang the peripheral edge of tray 12. The upper ends of the rods 15 are brought together and secured to a top plate 17. A top cap 18 covers the upper ends of the rods 15 and the top plate 17, and is provided with an opening through which the threaded shank end of an eye-bolt 19 extends into the cage after passing through an opening in the top plate 17.

A ring-shaped nut 20, by means of a threaded opening 21 therein, which is disposed in the periphery thereof, threadingly engages the shank portion of the eye-bolt 19 to clamp the top cap 18 to the cage. The nut 20 is ring-shaped in cross-section and has sides 22 and 23 that taper toward each other from the portion thereof in which the threaded opening 21 is disposed to a diametrically opposite portion to form a relatively narrow supporting surface 24 upon which the bail 25 of the bird swing rests. The bail 25 is formed of wire that is threaded through the ring-shaped nut 20, and has its ends secured to the bar 14 at opposite ends thereof.

The band or base side wall 11 comprises a strip of sheet metal that in the example shown is circumferentially ribbed, the upper rib 26 thereof being crimped over the lowermost rail 16 to secure the band thereto. The ends of the band 11 are brought together preferably at the rear of the cage, slightly over-lapped and soldered or welded together, the band being drawn tightly about the rail 16 whereby the band 11 and upper portion of the cage body are permanently joined. The band 11 is provided with an opening 27 that is disposed intermediate the upper and lower edges of the band and extends circumferentially thereabout an amount less than 180° in extent. Preferably, the opening 27 is disposed at the front of the cage beneath the door 28 thereof. Intermediate the upper and lower edges of the band the same is provided with circumferential ribs (in addition to rib 26) which are disposed respectively above and below the opening for the drawer. The material of the lower edge 29 of the band 11 is turned inwardly back upon itself to form a reinforced edge therefor.

The removable bottom plate 13 is of sheet metal which is pressed upwardly to form a vertically disposed annular shoulder 30 and a horizontally disposed peripheral ring 31, the peripheral edge of the ring 31 being rolled back upon itself to form a reinforced edge 32. The annular shoulder 31 is adapted to snugly fit within the band 11 in engagement with the reinforced lower edge 29 thereof, said edge 29 resting upon the peripheral ring 31. An elongated strip of sheet metal 33 having its ends 34 bent downwardly at substantially right angles to its body portion and soldered or welded to the plate 13, is provided, and disposed with its upper surface substantially in a horizontal plane in line with the lower edge of the opening 27 in the band 11. The strip 33 extends preferably through the major portion of the distance from the front to the rear of the cage.

Equally spaced about the band 11 are a plurality of catches 35 that are preferably of substantially L-shape and made of resilient sheet metal or other resilient material. Each of the catches 35 is hingedly secured at the top to the band 11 to swing downwardly and under the lower edge 29 thereof, being provided with a lower latch end 36 formed at substantially right angles to the body portion and being provided with a rolled lower end 37 adapted to snap over the peripheral ring 31 of the bottom plate 13, with the rolled end 37 disposed in back of the material forming the shoulder 30 and the body portion of the catch engaging the rolled edge 32 of the ring 31. Due to providing the catches with sufficient spring tension, the bottom plate 13 is retained upwardly and against the lower edge 29 of the band 11. The latch ends 36 of the catches 35 when in plate retaining position, form feet upon which the cage may rest when the same is placed upon a table or the like.

The drawer-type tray 12 is pressed out of sheet metal to form a bottom 39 and an upstanding peripheral flange 40 that is directed substantially at right angles to the bottom 39 and extends about the periphery thereof. The drawer flange 40 is formed with parallel side portions 41 and 42 that are spaced apart an amount substantially equal to the horizontal width of the opening 27 in the band 11 to permit the drawer to enter therein. The drawer 12, when inserted in the cage through the opening 27 rests upon the strip 33, being supported thereby during its insertion and withdrawal. A drawer front plate 43 is provided that is of sufficient length and width to extend beyond the drawer 12 at each side, and at the top and bottom, so as to completely cover the opening 27 and to limit the extent the drawer is inserted into the cage. A knob 44 is secured to the drawer front plate 43 to facilitate inserting and withdrawing the drawer from the cage.

By the provision of the ring-shaped combined nut and swing support 20, the top cap 18 may be effectively clamped in place and the bail 25 efficiently supported in a simple and efficient manner. The improved base structure is readily assembled, economical to manufacture and sturdy in structure. The provision of a removable drawer-shaped tray and a removable bottom plate is especially useful in facilitating the thorough cleaning of the cage.

While I have shown and described a preferred embodiment of my invention, it is understood that it is not to be limited to all of the details shown, but is capable of modification and variation which will lie within the spirit of the invention and the scope of the appended claims.

What I claim is:

1. A bird cage comprising a body portion including a horizontally disposed rail and a plurality of vertically disposed and peripherally spaced apart rods secured at their lower ends to said horizontally disposed rail, and a band wrapped about said rail and having its upper edge permanently secured thereto, said band having an opening in the wall thereof, a drawer having an upwardly directed edge movable through the opening in the wall of said band, said rail inwardly overhanging said edge of said drawer, a removable bottom plate abutting the lower edge of said band, and a strip-like member having its ends secured to said bottom plate and extending upwardly into engagement with, across the bottom surface of, and at substantially the median line of said drawer to support the same.

2. In a bird cage, a body portion including a horizontally disposed rail and vertically disposed rods secured at their lower ends to said horizontally disposed circular rail, a cylindrical band secured to and about said rail and extending downwardly therefrom, said band having an opening in its side wall intermediate its upper and lower edges and elongated peripherally about the same, a drawer slidable through the aforesaid opening, a removable bottom plate for said band and a narrow flat strip spaced upwardly from said bottom plate into engagement with the under surface of said drawer to support the same, said strip extending from adjacent one side of said band diametrically across said bottom plate to a point adjacent the other side of said band and having its ends bent downwardly and secured to said bottom plate.

3. In a bird cage, a body portion including a horizontally disposed rail and vertically disposed rods secured at their lower ends to said horizontally disposed circular rail, a cylindrical band secured to and about said rail and extending downwardly therefrom, said band having an opening in its side wall intermediate its upper and lower edges and elongated peripherally about the same, a drawer slidable through the aforesaid opening, a removable bottom plate for said band and a narrow flat strip spaced upwardly from said bottom plate into engagement with the under surface of said drawer to support the same, said strip extending along a median line of said drawer from adjacent one side of said band toward the side of said band having the opening therein and beyond the ends of the opening to engage said drawer as it enters said band to support the same, said strip having its ends bent downwardly and secured to said bottom plate.

4. In a bird cage, the combination of a base structure having a side wall and a removable bottom wall, said side wall having a drawer opening, a drawer movable through said opening, the bottom of said drawer being spaced upwardly from the bottom wall of said base structure, and a flat strip of material extending substantially across said bottom wall in supporting engagement with the underside of said drawer, each end of said strip being turned and directed into engagement with said bottom wall whereby said drawer is spaced from said bottom wall.

5. In a bird cage, the combination of a base structure having a side wall and a removable bottom wall, said side wall having a drawer opening, a drawer movable through said opening, the bottom of said drawer being spaced upwardly from the bottom wall of said base structure, and a flat strip of material extending substantially across said bottom wall in supporting engagement with the underside of said drawer substantially along the median line thereof, each end of said strip being turned downwardly into engagement with and secured to said bottom wall whereby said drawer is supported spaced above said bottom wall.

6. In a bird cage, a body portion including vertically disposed wires and a band permanently secured to said wires and forming the lower edge of said body portion, a removable bottom plate disposed against the lower end of said band, said band having an opening in the wall thereof, a drawer adapted to be received within said band through the opening in the wall thereof, and a flat strip of material extending substantially across said bottom plate, and means at each end of said strip and secured to said bottom plate to space said strip upwardly from said bottom plate to support said drawer within said band.

FRANK V. MEINDL.